(12) United States Patent
Shirali et al.

(10) Patent No.: US 6,537,065 B1
(45) Date of Patent: Mar. 25, 2003

(54) SEALED GAS BURNER

(75) Inventors: Manoucher Shirali, Greenwood, MS (US); James E. Hurley, Greenwood, MS (US)

(73) Assignee: Viking Range Corporation, Greenwood, MS (US)

(*) Notice: Subject to any disclaimer, the term of this patent is extended or adjusted under 35 U.S.C. 154(b) by 0 days.

(21) Appl. No.: 10/115,667

(22) Filed: Apr. 4, 2002

(51) Int. Cl.[7] .............................. F24C 3/08; F23D 14/06
(52) U.S. Cl. ........................ 431/354; 431/266; 126/39 E
(58) Field of Search ................................ 431/354, 355, 431/264, 266; 126/39 E

(56) References Cited

U.S. PATENT DOCUMENTS

| | | | |
|---|---|---|---|
| 2,450,790 A | * 10/1948 | Greaves | 239/427.3 |
| 4,572,154 A | 2/1986 | Schweitzer | 126/39 |
| 5,002,038 A | 3/1991 | Riehl | 126/39 |
| 5,040,970 A | 8/1991 | Riehl | 431/264 |
| 5,083,915 A | 1/1992 | Riehl | 431/264 |
| 5,085,202 A | 2/1992 | Riehl | 126/39 |
| 5,133,334 A | 7/1992 | Riehl | 126/39 |
| 5,149,262 A | 9/1992 | Riehl | 431/258 |
| 5,152,276 A | 10/1992 | Brock et al. | 126/39 |
| 5,160,255 A | 11/1992 | Sigler | 431/266 |
| 5,160,256 A | 11/1992 | Riehl | 431/266 |
| 5,266,026 A | 11/1993 | Riehl | 431/264 |
| 5,328,357 A | 7/1994 | Riehl | 431/266 |
| 5,468,145 A | 11/1995 | Ferlin | 431/266 |
| 5,628,302 A | 5/1997 | Schatz et al. | 126/39 |
| 5,690,483 A | 11/1997 | Oda et al. | 431/266 |
| 5,924,860 A | * 7/1999 | Massey et al. | 126/39 E |
| 5,954,492 A | 9/1999 | Lannes et al. | 431/177 |
| 5,961,311 A | 10/1999 | Moore, Jr. | 431/6 |
| 6,027,335 A | * 2/2000 | Griffioen | 431/266 |
| 6,056,542 A | 5/2000 | Lannes et al. | 431/354 |
| 6,173,708 B1 | 1/2001 | Arntz et al. | 126/39 |
| 6,209,534 B1 | * 4/2001 | Taplan | 126/214 A |
| 6,263,868 B1 | * 7/2001 | Koch et al. | 126/39 E |
| 6,299,436 B1 | * 10/2001 | Huang | 431/354 |

FOREIGN PATENT DOCUMENTS

| | | | | |
|---|---|---|---|---|
| EP | 751 352 | * | 1/1997 | 431/266 |
| EP | 994 301 | * | 4/2000 | 431/354 |
| JP | 11-325468 | * | 11/1990 | 126/39 E |

* cited by examiner

*Primary Examiner*—Carl D. Price
(74) *Attorney, Agent, or Firm*—Womble Carlyle Sandridge & Rice, PLLC

(57) ABSTRACT

A burner for a cooking range includes a burner base disposed on the range top, a burner body extending upwardly through aligned openings in the range top and the burner base to a threaded rim, a venturi having a threaded annular flange secured to the threaded rim of the burner body and a venturi tube depending from the flange through the burner body to a lower end. The burner base is sandwiched between the annular flange of the venturi and the range top and is thereby mounted to the range top by means of the venturi. A gas orifice is disposed beneath the bottom end of the venturi tube for ejecting gas upwardly into the venturi tube and a ported burner ring and burner cap rest on the burner base overlying the venturi tube. The burner is easily assembled and disassembled from the top without special tools and without raising or removing the range top. Components of the burner may be individually removed from the top of the range for maintenance or replacement. The venturi and the burner body cooperate to secure the burner base to the range top, thereby minimizing the need for additional fasteners and special tools. The burner provides a suitable gas-air mixture for efficient and clean combustion under a wide variety of circumstances without adjusting the venturi or an associated shutter.

11 Claims, 3 Drawing Sheets

SEALED GAS BURNER

TECHNICAL FIELD

This invention relates generally to gas ranges for home cooking and more particularly to upshot gas burner assemblies for gas ranges.

BACKGROUND

An upshot gas burner assembly for a gas range typically includes a base on the range top, a burner body beneath the range top in communication with a gas supply line for delivering gas to the burner, an orifice in the body for ejecting a metered amount of gas upwardly, a venturi above the orifice for receiving gas from the orifice and mixing it with air to form a gas-air mixture, a ported burner head overlying the venturi on the range top for discharging the gas-air mixture in a generally radially fingered pattern, and an igniter for igniting the gas-air mixture to produce a cooking flame. In many traditional burners, the base and the body are formed from a single piece of cast metal with a central opening, the body extending through an opening in the range top into the space below and the base resting on the range top. The gas line and orifice then connect to the base below the range top and a separate venturi mounts within the central opening. The base is secured to the range top with appropriate fasteners, such as screws. In many cases, adjustable vents or shutters or venturi position adjustments are provided for controlling the flow of air into the venturi to adjust the gas-air mixture ratios in the venturi. While such designs are functional, they nevertheless are relatively complex to assemble and even more troublesome to disassemble for cleaning and maintenance.

Many prior upshot burners also have included multi-piece venturi assemblies that include adjustments for regulating the gas-air mixture in the venturi. A set screw usually is provided for fixing the position of the adjustable portion of the venturi or an associated air regulation shutter when proper adjustment is obtained. The adjustability of the venturi in traditional burners is problematic because, among other things, it requires a relatively complex adjustment mechanism, is not easily removable for cleaning or maintenance, usually requires re-adjustment after removal, and is prone to being improperly adjusted, resulting in inefficient combustion in the cooking flame.

Accordingly, a need exists for an upshot burner for a gas range that provides for convenient removal and replacement of the venturi from the top without removing or raising the top tray of the range, convenient replacement of the gas orifice from the top without removal of the top tray, and easy and convenient cleaning of the burner base, ring, and cap. A burner that provides proper gas-air mixture within the venturi for efficient combustion under a wide range of conditions without the need for a multi-piece or adjustable venturi assembly is needed as is a burner that produces a stable flame and uniform distribution of heat over the heated area. Complete combustion, high flame controllability, quiet operation at all times, ease of ignition, and the ability to operate with a variety of gas compositions and pressures is desired. It is to the provision of a burner that meets these and other needs that the present invention is primarily directed.

SUMMARY OF THE INVENTION

Briefly described, the present invention, in a preferred embodiment thereof, comprises an upshot gas burner for a cooking range. The burner has a disc-shaped base that rests on the range top. The base has a central opening that aligns with a corresponding opening in the range top. A burner body has a generally cylindrical upper section that extends upwardly through the aligned openings in the range top and base to a threaded top rim. The body also is formed with a generally L-shaped hollow arm that depends from the upper section. The L-shaped arm has a threaded seat into which a gas orifice is threaded. The orifice, when threaded into the port, is centrally disposed beneath the cylindrical upper section. A gas supply line couples to the end of the arm to supply gas to the orifice, which is oriented to eject a metered flow of gas in an upward direction.

A single piece venturi has an elongated venturi tube with a lower end and an upper end. The upper end of the venturi is formed with a radially projecting annular flange that includes an internally threaded annular recess on its bottom side. The recess is sized to receive the threaded top rim of the cylindrical upper section of the burner body with the internal threads of the recess engaging the threads on the top rim of the body. With this arrangement, the burner may be mounted easily in the range top by moving the top section of the body upwardly through the aligned openings in the range top and base, inserting the venturi tube through the cylindrical upper section of the body, and threading the annular flange of the venturi tightly onto the top rim of the body. A burner ring and burner cap are then positioned on the base overlying the exit opening of the venturi tube to complete the assembly of the burner. To remove the venturi for cleaning, maintenance, or replacement, the burner ring and cap are removed and the venturi is simply unthreaded and removed from the base, all without removing or raising the range top itself. Further, with the venturi removed, the gas orifice is easily accessible through the top section of the body and can be removed for cleaning or replacement with a socket, again without removing or raising the range top.

The venturi tube of the venturi is carefully sized and configured such that, when the burner is mounted in the range top as described, the bottom end of the venturi tube is positioned at the appropriate distance above the gas orifice. This distance is predetermined to insure that the proper volume of air is drawn into the venturi tube with the gas flow, where it is mixed with the gas in the appropriate mixture for complete and efficient combustion under a variety of gas composition and line pressure conditions.

Thus, an upshot gas burner for a cooking range is now provided that successfully addresses the problems and shortcomings of traditional burners. The burner is easily installed in a range top and the venturi and orifice may be removed quickly and easily from the top for cleaning or replacement. Due to the careful positioning and configuration of the single piece venturi tube, the gas-air mixture is optimized for a wide variety of conditions without the need for any venturi adjustment mechanism or movable shutters. Accordingly, the venturi tube is fixed and not subject to mis-adjustment as in the prior art. The burner produces a stable flame that is easily ignited, provides uniform heat, and operates quietly at all flame intensities. These and other features, objects, and advantages of the burner of this invention will become more apparent upon review of the detailed description set forth below, when taken in conjunction with the accompanying drawing figures, which are briefly described as follows.

DETAILED DESCRIPTION OF THE PREFERRED EMBODIMENTS

Figure 1:
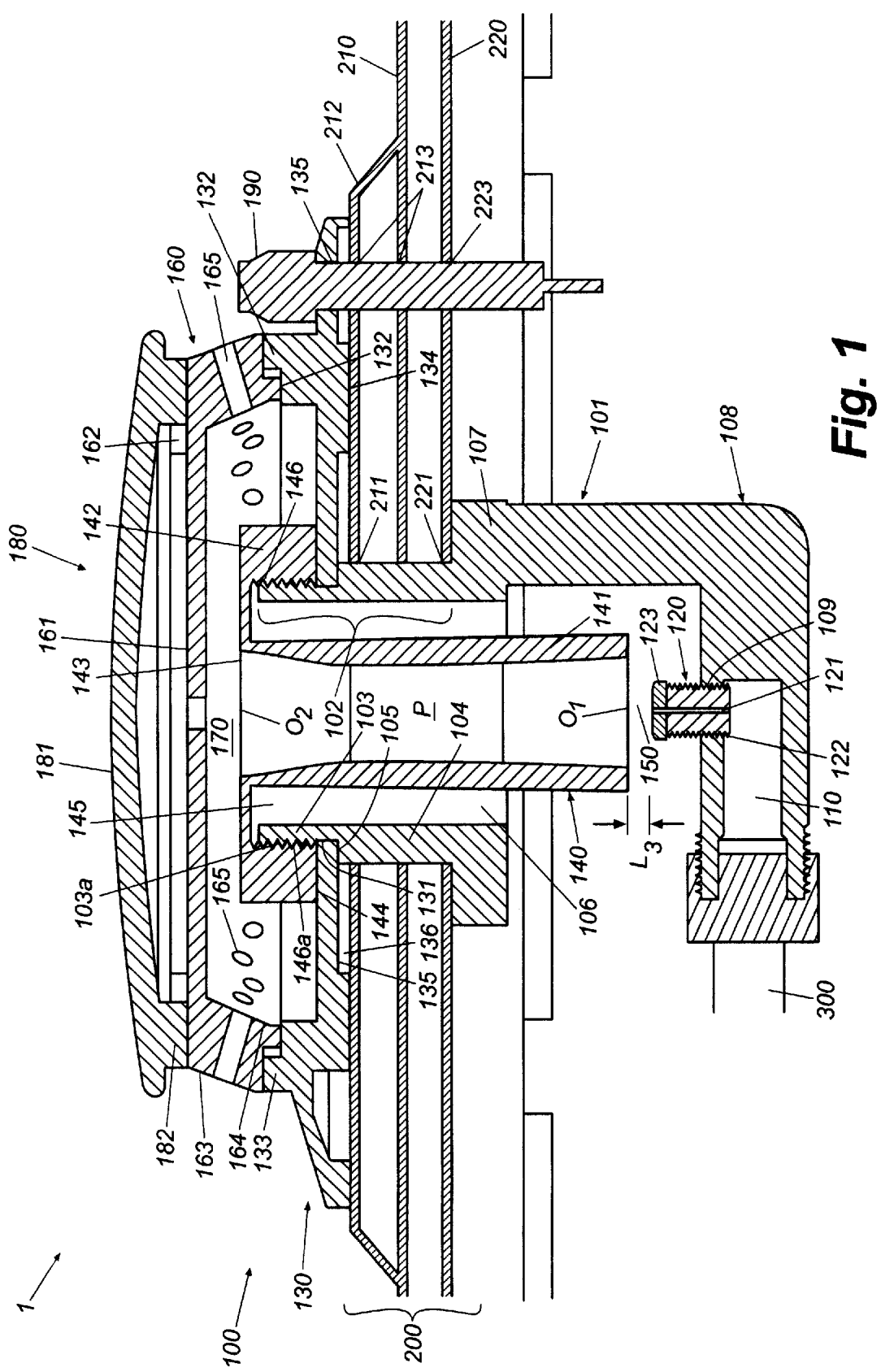
FIG. 1 is a cross-sectional view of a portion of a range top and a sealed upshot burner assembly embodying principles of the present invention.
Figure 2:
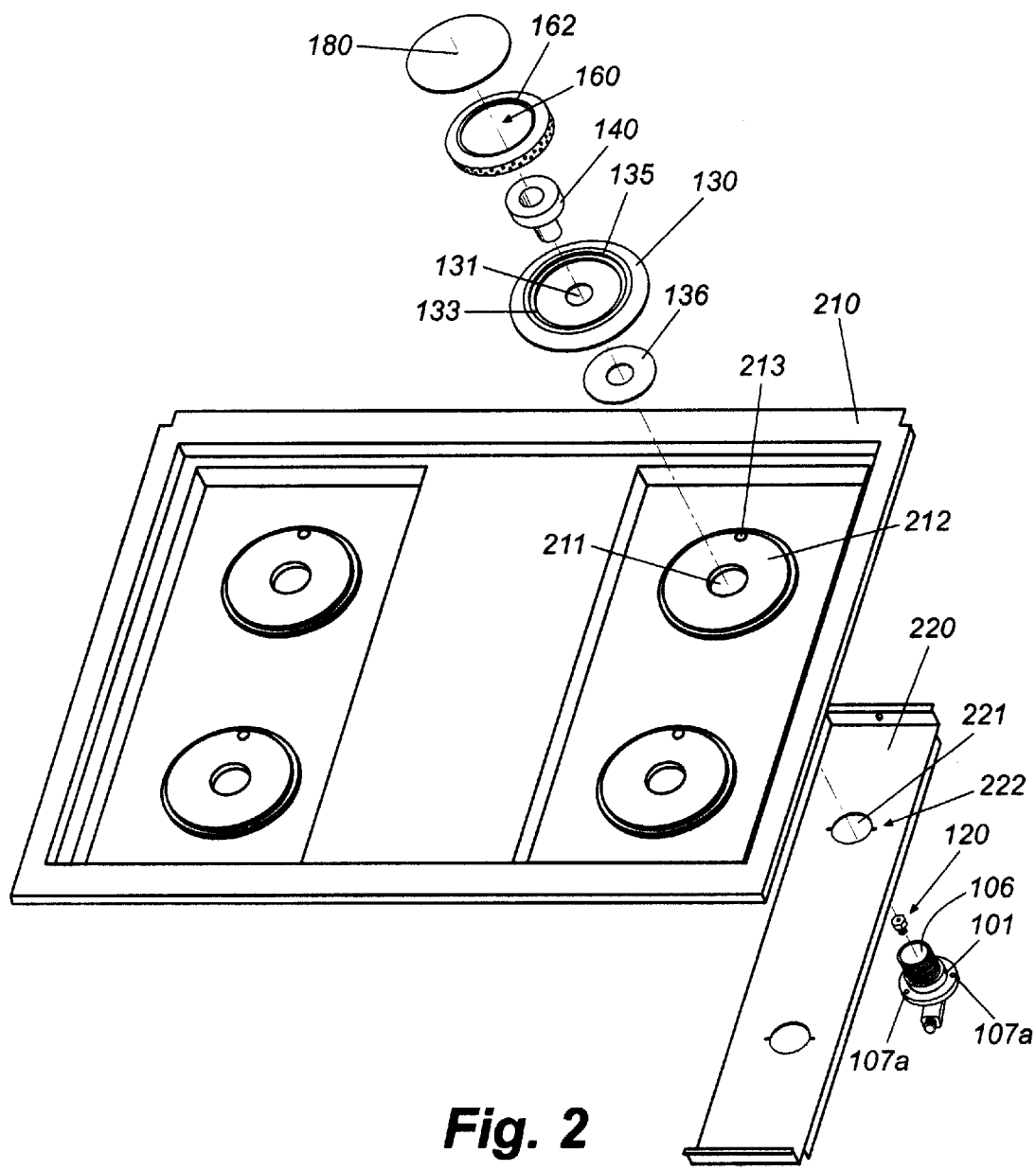
FIG. 2 is an exploded perspective view of a range top and burner assembly according to the invention.

FIGS. 1–4 illustrate in detail a preferred embodiment of the present invention that represents what is considered to be the best mode of carrying out the invention. In FIG. 1, a sealed upshot burner is indicated generally by reference numeral 100. The burner 100 is shown installed in the top 200 of a cooking range, which generally is indicated by reference numeral 1. The range top 200 includes a top surface 210 and a burner support 220, which is secured beneath the top surface 210. Gas is supplied to the burner through a gas pipe 300 from a gas supply (not shown). As illustrated in FIGS. 1 and 2, the burner 100 comprises multiple, removable components. More specifically, the burner 100 includes a burner body 101, a removable gas orifice 120, a removable burner base 130, a removable venturi 140, a removable ported burner ring 160 supported on the burner base 130, and a removable burner cap 180 supported on the burner ring 160. It should be understood that the term "removable" to describe certain components of the burner indicates that these components may be individually removed from the burner 100. The construction of the burner 100 will now be described in greater detail.

Figure 3:
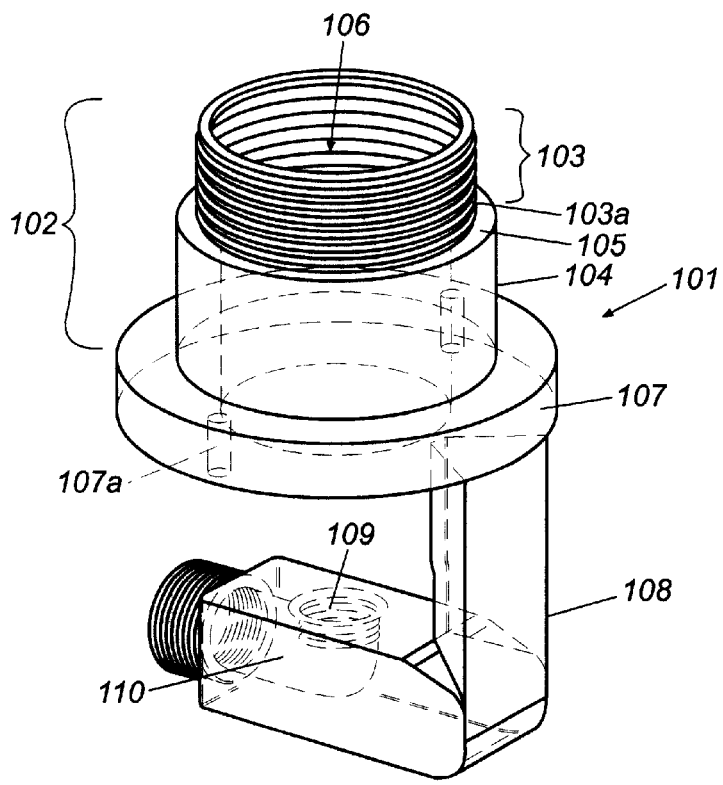
FIG. 3 is a perspective partially transparent view of the burner body illustrated in FIGS. 1 and 2.

Referring to FIGS. 1 and 3, the burner body 101 generally comprises a substantially cylindrical top section or venturi tube housing 102 formed with an annular flange 107 disposed around its lower end portion. The body 101 is further formed with a substantially L-shaped arm 108 that depends from the housing 102 with a horizontal section of the arm disposed below the venturi tube housing 102. The venturi tube housing 102 is formed with an externally threaded, reduced-diameter upper rim 103 having external threads 103a and a mid-section 104 having a greater outer diameter than that of the upper rim 103. An upper annular shelf 105 defines the junction between the threaded upper rim 103 and the mid-section 104. A cylindrical interior passage 106 extends through the venturi tube housing 102. The L-shaped arm 108 extends downwardly and then transversely from the annular flange 107 and includes a threaded orifice seat 109 that communicates with a gas flow passageway 110. According to one embodiment of the invention, the burner body 101 is constructed of cast aluminum, although other suitable materials may be used. The range top 200, which includes the top surface 210, the support 220, and the mount 212, is formed with aligned openings for receiving the body 101. The burner base 130 also has a central opening that is aligned with the openings in the range top 200.

When the burner body 101 is installed in the range top 200, as shown in FIG. 2, the venturi tube housing 102 extends through the central openings 211 and 221 of the top surface 210 and burner support 220, respectively, and the annular flange 107 engages and is secured to the burner support 220 about its opening 221. The annular flange 107 and burner support 220 may include screw holes 107a and 222, respectively, and screws or other fasteners (not shown) may extend through the holes 107a and 222 to secure the burner body 101 to the burner support 220. The L-shaped arm 108 of the burner body connects at its distal end to the gas pipe 300 such that the gas inlet 110 communicates with the gas pipe 300.

A gas orifice 120, shown best in FIG. 2, is provided to direct and meter the flow of gas into the venturi tube 140. The orifice 120 preferably is constructed of brass, but may be constructed from another suitable material. The orifice 120 includes a central bore 121 through which gas is expelled and has external threads 122 that engage the threaded seat 109 to mount the orifice in the arm 108 underlying and spaced from the venturi tube. According to one embodiment, the orifice 120 is formed with a hexagonal top 123, so that the orifice 120 can be gripped by a socket or wrench for mounting or removing the orifice from its seat from the top of the range.

As best illustrated in FIGS. 1 and 2, the burner base 130 supports the burner ring 160 and the burner cap 180 rest atop the burner ring. The burner base 130 is substantially disk-shaped and includes a central opening 131, a top side 132, a raised annular ledge 133 protruding from the top side 132, and an annular bottom side 134, including a recessed middle area 135. The burner base 130 is formed with an igniter hole 137 for receiving an igniter 190. According to one embodiment, the burner base 101 is constructed of aluminum, but other suitable materials may be used.

As shown in FIG. 1, when the burner 100 is installed in the range top 200, a gasket 136 is fitted within the recessed middle area 135 of the burner base 130, and the burner base rests on the burner mount 212 of the top surface 210. The gasket provides a seal against spills and other contaminants. The burner base 130 is positioned such that the bottom side 134 of burner base 130 rests on the burner mount 212 with its central opening aligned with the openings in the range top elements. The threaded rim 103 of the burner body 101 extends upwardly through and protrudes from the central opening 131 of the burner base 130. The igniter hole 137 in the burner base is aligned with an igniter hole 213 of the burner mount 212 and the igniter 190 is received in the igniter hole 137 of the burner base, igniter hole 213 of the burner mount, and igniter hole 223 of the burner support 220 as shown.

The venturi 140 will now be described with reference to FIGS. 1 and 4. The venturi 140 comprises an elongated venturi tube 141 having a bottom end portion and a top end portion and an integral annular flange 142 extending radially outwardly from the top portion of the venturi tube 141. According to one embodiment of the invention, the venturi 140 may be constructed of brass, however other suitable materials may be used. The annular flange 142 has a top side 143 and a bottom side 144. An internally threaded annular recess 145 is formed in the bottom side 144 of the annular flange 142. The recess 145 has an outer annular wall 146 with interior threads 146a. The interior threads 146a are sized to engage the external threads 103a on the top rim of the burner body 101 to secure the venturi 140 to the burner body 101. More specifically, the venturi 140 is threaded onto the top rim of the burner body 101 with the interior threads 146a of the venturi engaging the external threads 103a of the burner body 101.

Figure 4:
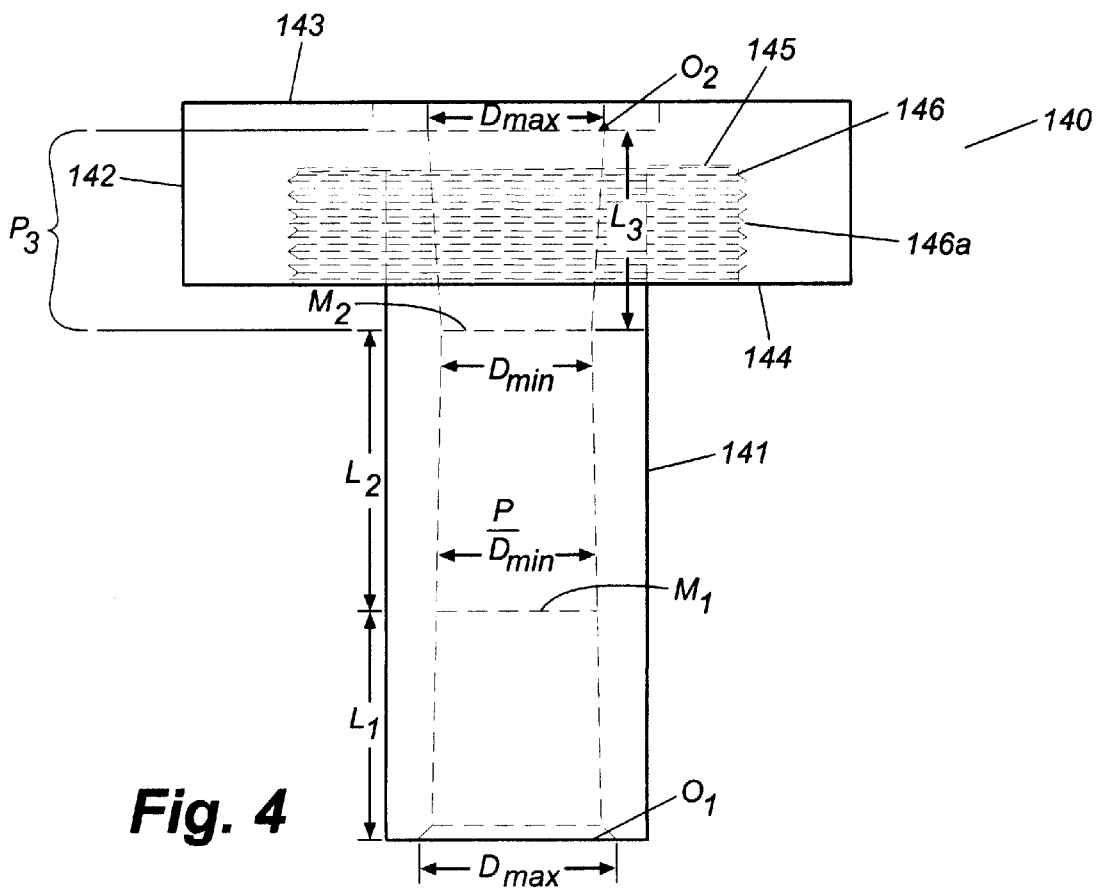
FIG. 4 is a side elevational partially transparent view of the venturi illustrated in FIGS. 1 and 2.

Referring to FIG. 4, a venturi throat P extends through the venturi 140 from a bottom opening $O_1$ to a top opening $O_2$. The bottom opening $O_1$ is aligned with and overlies the orifice 120 when the burner is installed as shown in FIG. 1 such that an air space resides between the two. The throat P includes a lower section $P_1$ extending from the opening $O_1$ to a lower midpoint $M_1$ of the throat, a middle section $P_2$ extending upward from the lower midpoint $M_1$ to an upper midpoint $M_2$ of the throat, and an upper section $P_3$ extending upward from the midpoint $M_2$ to the top opening $O_2$. The openings $O_1$ and $O_2$ each have a diameter $D_{max}$, which is the maximum diameter of the throat P. The midpoints $M_1$ and $M_2$ each have a diameter $D_{min}$, which is the minimum diameter of the throat P. The diameter of the lower section $P_1$ decreases from the bottom opening $O_1$ towards the lower midpoint $M_1$. The diameter of the middle section $P_2$ is substantially constant, and corresponds to the minimum diameter $D_{min}$. The diameter of the upper section $P_3$ increases from the upper midpoint $M_2$ to the top opening $O_2$.

Referring again to FIG. 1, when the burner 20 is assembled in a range top, the venturi 140 is threaded securely onto the top rim of the burner body sandwiching and securing the base 130 onto the range top. The venturi tube 141 of the venturi 140 resides within and extends downwardly through the interior passage 106 of the burner body 101, and the annular flange 142 of the venturi 140 is secured to the threaded top rim 103 of the burner body 101. When the venturi 140 is fully and securely threaded on the burner body 101, the bottom side 144 of the venturi's flange 142 engages the top side of the burner base 132, and the upper annular shelf 105 of the burner body 101 engages the recessed middle area 135 on the bottom of the burner base. The venturi tube 140, the burner body 101 and the burner base 130 are thus secured together such that the burner base 130 is sandwiched between the range top and the annular rim of the venturi. Accordingly, the venturi 140 and the burner body 101 cooperate to secure the burner base 130 to the top surface 210 of the range top 200 and generally to mount the entire burner assembly in the range top without the need for any other fasteners.

As shown in FIG. 1, when the venturi 140 is secured within the burner 100, its throat P is coaxially aligned with the opening 121 of the orifice 120 and the bottom opening $O_1$ of the throat is spaced from the orifice 120 forming air gap 150. The orifice 120 meters and directs the flow of gas from the gas inlet 110 upwardly through the air gap 150, and this gas flow draws air into opening $O_1$ according to the venturi effect. The gas and air mix within the venturi throat to produce a gas-air mixture that flows upwardly through the throat P of the venturi 140.

The dimensions of the air gap 150 and the venturi throat P are selected such that the burner is efficient and effective without requiring adjustment of the position of the venturi tube 140 or the air gap to adjust air flow through venturi 140. In other words, the venturi tube 140 is secured in a fixed, non-adjustable position. According to one preferred embodiment of the invention, the air gap 150 has a length $L_g$, extending from the orifice 120 to the venturi tube 140, of 0.080–0.140, the lower section $P_1$ has a length $L_1$ of 0.600–0.750, the middle section $P_2$ has a length $L_2$ of 0.800–0.950, the upper section $P_3$ has a length $L_3$ of 0.600–0.750, the diameter $D_{max}$ is 0.500–0.625 and the diameter $D_{min}$ is 0.450–0.490.

The ported annular burner ring 160 will now be described with respect to FIGS. 1 and 2. The burner ring 160 is formed with a top surface 161 and an annular outer wall 163 extending at an angle downwardly from the top surface 161. The top surface 161 is formed with a raised annular ledge 162 for supporting and centering the burner cap 180. The outer wall 163 includes a recessed notch 164 and a plurality of flame ports 165 are formed through and arrayed about the annular wall for expelling the gas-air mixture in a radially fingered pattern, which is ignited to form the cooking flame. According to one embodiment of the invention, the burner ring 160 is constructed of brass, although other appropriate materials may be used.

When the burner ring 160 is properly positioned for use, it rests on top of the burner base 130 such that the recessed wall portion 164 engages the raised annular ledge 133 of the burner base 130 to position and center the burner ring. A plenum 170 is defined between the top side 132 of the burner base 130 and interior surfaces 166 of the burner ring 160. The plenum 170 communicates with the flame ports 165. The annular flange 142 of the venturi 140 is disposed within the plenum 170 such that the throat P communicates with the plenum 170. The plenum 170 receives the gas-air mixture from the throat P and the gas-air mixture is expelled through the flame ports 165 of the burner ring for ignition by the igniter 190.

The burner cap 180, shown in FIGS. 1 and 3, includes a convex disc-shaped top portion 181 and a lower annular extension 182 extending from the top portion 181. The burner cap 180 rests on top of the burner ring 160 forming the top of the plenum 170 and cooperates with the igniter 190 to generate a spark for igniting the gas-air mixture expelled from the flame ports 165. More specifically, the lower annular extension 182 rests on the top surface 161 of the burner ring 160 and is laterally centered by the raised annular ledge 162, which has an outer diameter that is slightly smaller than the inner diameter of the lower annular extension 182. According to preferred embodiments of the invention, the burner cap 180 can be constructed from enameled steel or enameled cast iron, although other suitable materials may be used.

The method of assembling the burner 100 will now be described with reference to FIGS. 2 and 3. The burner body 101 is coupled to the gas pipe 300 as shown. The burner body 101 is secured to the range top 200 by inserting the cylindrical venturi tube housing 102 through the central openings 221 and 211 of burner support 220 and the top surface 210, respectively, and securing the lower annular flange .107 to the burner support 220 with screws (not shown). The gas orifice 120 is threaded into the seat 109 of the arm 108. It should be noted that the orifice 120 can be mounted before or after the burner body is secured to the burner support 220. As best seen in FIG. 2, the orifice 120 is accessible through the openings 221 and 211, so that it can be installed and removed from the top of the range without removing the burner body 101 from the range top 200 or lifting the range top itself.

Once the burner body is positioned in the range top 200, the burner base 130 (with the gasket 136 installed therein) is positioned on the top surface 210 such that the central opening 131 and igniter hole 137 of the burner base are aligned with the central opening 211 and igniter hole 213 of the top surface 210, respectively. The igniter 190 is received into the igniter holes 135 and 213.

When the burner base is placed on the top surface 210, the venturi 140 is positioned in the burner body and securely threaded in place as described above. More specifically, the venturi tube 141 of the venturi 140 is inserted through the interior passage 106 of the burner body 101 and the threaded annular flange 142 of the venturi tube is threaded onto the upper rim 103 of the burner body 101. Thus, the venturi 140 can be installed in and removed from the burner from the top without special tools and without removing or raising the range top.

With the venturi installed, the burner ring 160 is placed on the burner base 130 such that the recessed wall portion 164 of the burner ring 160 engages the raised annular ledge 133 of the burner base 130. The burner cap 180 is then placed on the burner ring 160 such that lower annular extension 18.2 of the burner cap rests on the top surface 161 of the burner ring 160 and is laterally centered by the raised annular ledge 162.

The operation of the burner 100 will now be discussed in greater detail. When the burner is turned on (i.e., gas is a allowed to flow through the gas pipe 300 to the burner 100), gas flows from the gas pipe 300 into the gas inlet 110 of the burner body 101. Gas then flows from the gas inlet 110 upwardly through the orifice 120 and across the air gap 150. As the gas flows across the air gap 150 and into the throat of the venturi, it creates a venturi effect that draws air into the venturi throat creating a gas-air mixture. The gas-air mixture mixes and flows upwardly through throat P of the venturi 140, and eventually exits the throat and enters the plenum 170. The gas-air mixture then flows through the flame ports 165 of the burner ring 160 and exits in a radially fingered pattern where it is ignited by a spark generated between the igniter 190 and the burner cap 160. Thereafter, gas-air mixture continues to flow as described above to fuel the cooking flame.

The burner 100 is easily assembled and disassembled with minimal usage of tools and from the top of the range. The venturi 140 and burner body 101 function as fasteners that mount the burner to the range. Components of the burner can be individually removed for maintenance or replacement. Therefore, damaged or worn components can be easily replaced without requiring replacement the entire burner assembly. Furthermore, with the exception of the burner body 101, the individual components of the assembly 100 can be replaced without uninstalling the entire burner 100. The venturi 140 and orifice 120 can be removed from and installed in the burner 100 all from the top without requiring removal or raising of the range top. Additionally, variations of each component can be made such that the burner can be adapted to fit many different types of range tops, without requiring a redesign of the entire burner.

It will be understood by those skilled in the art that while the foregoing invention has a been disclosed with reference to preferred embodiments or features, various modifications, changes and additions can be made to the illustrated embodiments without departing from the spirit and scope of the invention as set forth in the claims.

What is claimed is:

1. A cooking range comprising:
   a range top comprising an opening formed therethrough;
   a burner base positioned on said range top and comprising an opening aligned with said opening in said range top;
   a burner body extending upwardly through said aligned openings in said range top and said burner base, wherein said burner body comprises a threaded rim;
   a venturi comprising an elongated venturi tube with a threaded flange at an end thereof, wherein said threaded flange is threaded onto said threaded rim to secure said burner base, said burner body, and said venturi to said range top with said venturi tube extending through said burner body;
   a gas orifice disposed below a lower end of said venturi tube and communicating with a gas supply for ejecting gas upwardly toward and into said venturi tube, wherein the gas is mixed with air; and
   a burner ring and burner cap overlying said venturi for receiving a gas-air mixture from said venturi tube and expelling it outwardly in a generally radial pattern for combustion as a cooking flame.

2. A cooking range as claimed in claim 1 and wherein said venturi tube is fixed relative to said orifice.

3. A cooking range as claimed in claim 1 and wherein said burner body is formed with a depending arm at least partially extending beneath said lower end of said venturi tube, said arm being formed with an internal gas passageway and said orifice being mounted in said arm in communication with said gas passageway.

4. A cooking range as claimed in claim 1 and wherein said threaded rim includes external threads and said threaded flange includes internal threads, and wherein said external threads engage said internal threads.

5. A cooking range as claimed in claim 1 and wherein said burner ring rests on said burner base and said burner cap rests on said burner ring.

6. A burner for a cooking range comprising:
   a burner base mounted on a top surface of the range;
   a burner body comprising an upper rim and extending through an opening in the top surface of the range and through an aligned opening in said burner base;
   a burner ring and a burner cap disposed on said burner base, wherein said burner ring comprises an array of flame ports through which fuel is expelled and ignited to generate a cooking flame;
   a plenum defined by said burner ring, said burner cap, and said burner base;
   a venturi comprising an annular flange secured to said upper rim of said burner body and a venturi tube extending downwardly from said annular flange through said burner body, said burner base being sandwiched against the range top by said annular flange; and
   a gas orifice mounted below and spaced from a lower end of said venturi tube for ejecting gas upwardly into said venturi tube to be mixed with air forming a gas-air mixture fuel, wherein said fuel moves upwardly through said venturi tube, into said plenum, and out through said ports in said burner ring to be ignited as a cooking flame.

7. The burner of claim 6, wherein said venturi tube is secured in a fixed non-adjustable position within the burner body.

8. The burner of claim 6 and wherein said annular flange of said venturi and said upper rim of said burner body are threadably secured together.

9. In a burner for a cooking range having a burner body with an upper rim and a venturi tube disposed in the burner body, the improvement wherein said venturi tube is secured at an upper end thereof to said upper rim of said burner body, and wherein said upper rim of said burner body is threaded and said upper end of said venturi tube is formed with a threaded annular flange, wherein said annular flange is threaded onto said upper rim of said burner body.

10. The improvement of claim 9 and further comprising a range top with an opening and a burner base disposed on said range top and having an opening aligned with said opening in said range top, said burner body extending upwardly through said aligned openings and said annular flange on said venturi tube securing said burner base to said range top.

11. The improvement of claim 9 and wherein said venturi tube is fixed and non-adjustable within said burner body.

* * * * *